US00RE42235E

(19) United States
(12) Reissued Patent
Chu

(10) Patent Number: US RE42,235 E
(45) Date of Reissued Patent: Mar. 22, 2011

(54) COMPENSATION METHOD AND DEVICE FOR TRACKING OPERATION OF OPTICAL STORAGE SYSTEM

(75) Inventor: Meng H. Chu, Tapei (TW)

(73) Assignee: Tian Holdings, LLC, Wilmington, DE (US)

(21) Appl. No.: 11/971,763

(22) Filed: Jan. 9, 2008

Related U.S. Patent Documents

Reissue of:
(64) Patent No.: 6,985,413
Issued: Jan. 10, 2006
Appl. No.: 10/404,379
Filed: Apr. 1, 2003

(51) Int. Cl.
*G11B 7/00* (2006.01)

(52) U.S. Cl. ..... 369/44.32; 369/44.29; 369/44.35; 369/53.14; 369/53.26; 369/44.36; 369/53.28; 369/53.19

(58) Field of Classification Search ..... 369/44.32, 369/53.14, 44.29, 44.35, 53.28, 53.26
See application file for complete search history.

(56) References Cited

U.S. PATENT DOCUMENTS 4,786,849 A 11/1988 Tateishi ..... 318/632
5,014,256 A * 5/1991 Horie et al. ..... 369/44.35
5,113,384 A 5/1992 McDonald et al. ..... 369/44.29
5,532,990 A 7/1996 Koyama et al. ..... 369/44.32
5,627,808 A 5/1997 Hajjar et al. ..... 369/44.32
5,886,963 A 3/1999 Abe et al. ..... 369/44.35
6,549,492 B1 4/2003 Song ..... 369/44.29
6,785,205 B2 8/2004 Park et al. ..... 369/44.32
2003/0072222 A1 4/2003 Sekine et al. ..... 369/30.16
2003/0072226 A1 4/2003 Watanabe et al. ..... 369/44.32

* cited by examiner

*Primary Examiner*—Van N Chow

(57) ABSTRACT

An optical storage system includes a pickup head for picking up data from a storage medium. Firstly, the maxima of a tracking error signal and runout are obtained in a calibration procedure in a close loop formed by an optical pickup head, a pre-amplifier, a compensator, a band-pass filter and a maximum detector. A calibration factor is then defined and derived by using the obtained maxima and nominal factors of a power amplifier and the optical pickup head of the optical storage system. The path formed by the series-connected band-pass filter and maximum detector is then disabled, while the calculated calibration factor is then stored in the compensator. The optical storage system may operate in a close loop formed by the optical pick head, pre-amplifier, compensator, a power amplifier under a normal operation procedure so that the optical storage system may record or read data onto/from an optical disc under the compensation provided by the calibration factor.

41 Claims, 3 Drawing Sheets

COMPENSATION METHOD AND DEVICE FOR TRACKING OPERATION OF OPTICAL STORAGE SYSTEM

Matter enclosed in heavy brackets [ ] appears in the original patent but forms no part of this reissue specification; matter printed in italics indicates the additions made by reissue.

FIELD OF THE INVENTION

The present invention relates to a method for compensating a tracking operation of an optical storage system, and more particularly to a method for compensating a tracking operation of a pickup head of an optical storage system. The present invention also relates to a device for compensating a tracking operation of an optical pickup head of an optical storage system.

BACKGROUND OF THE INVENTION

Optical storage systems record digital data onto the surface of a storage medium, which is typically in the form of a rotating magnetic or optical disc, by altering a surface characteristic of the disc. The digital data serves to modulate the operation of a write transducer (write head), which records binary sequences onto the disc in radially concentric or spiral tracks. When reading this recorded data, a read transducer (read head), positioned in close proximity to the rotating disc, detects the alterations on the medium and generates a sequence of corresponding pulses in an analog read signal. These pulses are then detected and decoded by read channel circuitry in order to reproduce the digital sequence. When the pickup (read/write) head of the computer storage system operates, a light beam emitted by a light source such as a laser diode is focused by an object lens on the rotating disc so as to realize the information carried thereby.

Referring to FIG. 1, a conventional tracking control device 10 for controlling tracking operation of an optical pickup head (or, an actuator) 11 comprises a pre-amplifier 12, a compensator 13 and a power amplifier 14. An optical disc 1 is often rendered eccentric in the manufacturing process. In addition, when the optical disc is loaded into an optical disk drive and then clamped by a spindle motor, the center optical disc might be eccentric from the center of the optical disk drive, resulting in a certain degree of runout R while rotating. During operation, an error signal e between the position P of the optical pickup head 11 relative to the disc 1 and the runout R is processed by the pre-amplifier 12 to generate a tracking error TE. If the tracking error TE is substantially zero, it means the optical pickup head 11 has precisely locked the target track, and will acquire correct data. In order to converge the tracking error TE to zero, the generated tracking error TE is transmitted to the compensator 13, e.g. a digital signal processor (DSP), to be processed. The compensator 13 operates on the tracking error TE to generate a tracking output signal TRO for the shift control of the optical pickup head 11. The power amplifier 14 then magnifies the generated tracking output signal TRO for actuating the optical pickup head 11 to move along the current tracking direction. The position information of the optical pickup head 11 relative to the disc 1 is then detected and transmitted to the pre-amplifier 12 again, and the above procedures are repetitively executed until the tracking error TE is lowered to an acceptable level (substantially zero).

As is understood by those skilled in the art, the performance of an optical disk drive, including quality and speed, depends largely on the tracking operation of the optical pickup head 11. For example, the pickup rate of the optical disk drive will be adversely affected if the above-mentioned tracking operation has to repeat a number of times to lock the correct track.

In addition to the eccentricities, some parameters such as the gain variations of different power amplifiers and the moving sensitivity variations of different optical pickup heads (both of the variations may depend on manufacturing processes or element degenerations) might also cause the increase of tracking operation time because they are not taken into account in advance in the conventional tracking control method.

SUMMARY OF THE INVENTION

It is an object of the present invention to provide a method and a device for compensating a tracking operation of a computer storage system to simultaneously compensate some operating parameters in addition to runout in order to speed up tracking.

It is another object of the present invention to provide a tracking output signal generator for increasing tracking performance of an optical disk drive by compensating some operating parameters in advance.

In accordance with an aspect of the present invention, there is provided a method for controlling a tracking operation of an optical storage system. The optical storage system comprises a pickup head for picking up data from a storage medium. Firstly, a runout associated with a relative motion between the pickup head and the storage medium is obtained when the optical pick head is in a status of focus-on but not track-on. A calibration procedure is next performed to find maxima of runout and a tracking output signal, respectively. Thereafter, a calibration factor is defined and calculated by using the derived maxima and the nominal factors of the power amplifier and the optical pickup head, while the calculated calibration factor is stored in the compensator for the use of the optical pickup head. After the pickup head is in a status of track-on, the stored calibration factor is used to provide compensation to the optical disk drive in the following normal operation procedure including data reading or writing operations.

In an embodiment, the nominal factor includes a gain of the power amplifier.

In an embodiment, the nominal factor includes a sensitivity of the pickup head.

In an embodiment, the calibration factor K is defined by the following formula:

$$K = \frac{C_{NOM} \times D_{NOM}}{C \times D}$$

where $C_{NOM}$ is a nominal gain of a power amplifier, $D_{NOM}$ is a nominal sensitivity of the pickup head, C is an actual gain of the power amplifier in operation, and D is an actual sensitivity of the pickup head in operation.

In an embodiment, the method of the present invention further comprises a step of filtering out noise from the tracking output signal to obtain a maximum of the tracking output signal.

In an embodiment, $$C \times D \approx \frac{R_{MAX}}{TRO_{MAX}}$$

where $R_{MAX}$ is the maximum runout, and $TRO_{MAX}$ is the maximum of the tracking output signal.

In an embodiment, the nominal gain of the power amplifier and the nominal sensitivity of the optical pickup head are constant values.

In accordance with another aspect of the present invention, there is provided a control device embedded in an optical storage system. The disclosed control device basically includes a pickup head, a tracking error signal generator, a tracking output signal generator, a power amplifier, a band-pass filter, and a maximum detector. In a calibration procedure, the pickup head, tracking error signal generator, tracking output signal generator, band-pass filter and the maximum detector form a close loop for the purpose of deriving a calibration factor for the computer storage system. Maxima of the runout and the tracking output signal are first derived, while the calibration factor is defined and calculated by using the derived maxima and the nominal factors of the power amplifier and the pickup head. In a normal operation procedure, the pickup head, tracking error signal generator, tracking output signal generator, power amplifier form another close loop to read/record data from/to a disc under the compensation provided by the derived calibration factor.

In an embodiment, the tracking error signal generator is a pre-amplifier.

In an embodiment, the tracking output signal generator includes a compensator. Preferably, the compensator is a digital signal processor (DSP).

In an embodiment, the nominal factor includes the gain of a power amplifier.

In another embodiment, the nominal factor further includes the sensitivity of the pickup head.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
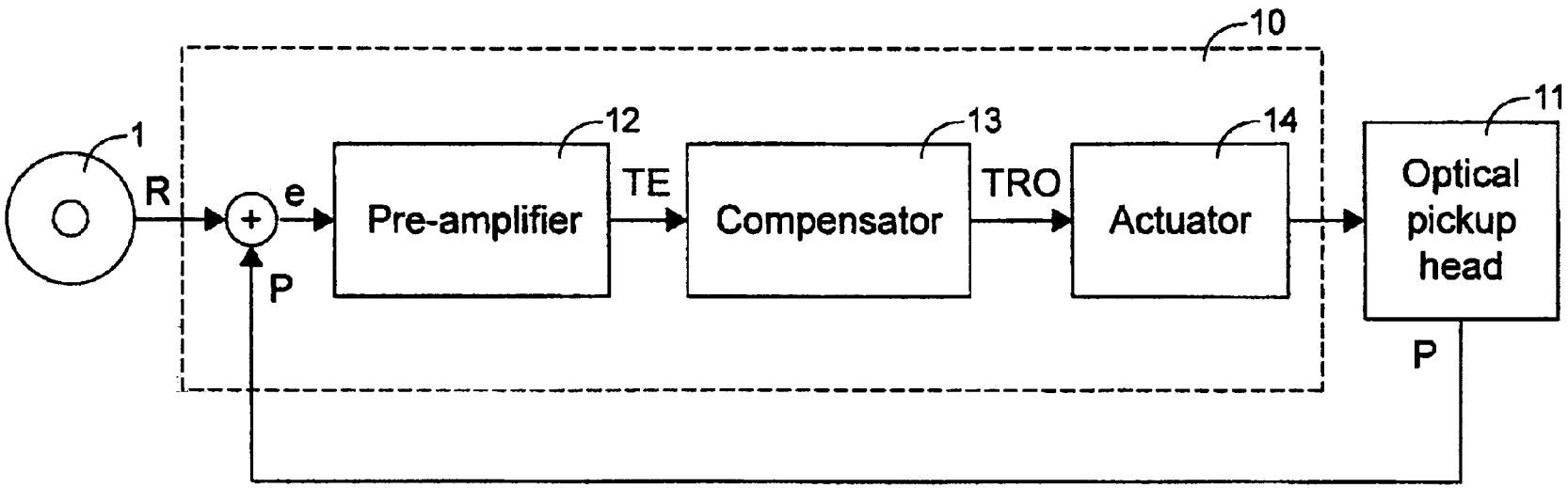
Fig.1 PRIOR ART
FIG. 1 is a functional block diagram illustrating a conventional tracking control system for an optical pickup head.
Figure 2:
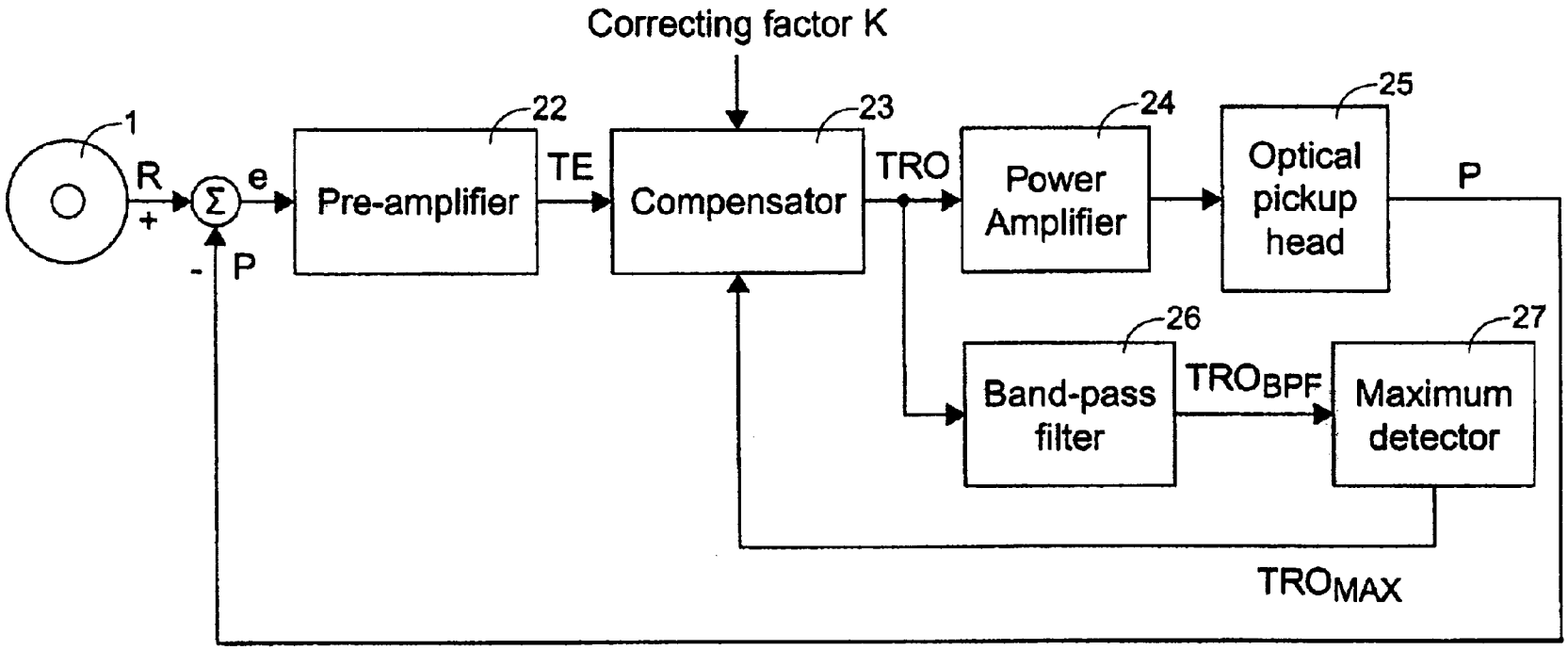
FIG. 2 is a functional block diagram illustrating a tracking control system for an optical pickup head according to a preferred embodiment of the present invention.

Please refer to FIG. 2, which illustrates an optical storage system according to a preferred embodiment of the present invention. The optical storage system of FIG. 2 is a control device of an optical disc drive, which includes a pre-amplifier 22, a compensator 23, a power amplifier 24, an optical pickup head 25, a band-pass filter 26, and a maximum detector 27. The optical pickup head 25 picks up data from an optical disc 1. During operation, an error signal e between the position P of the optical pickup head 25 relative to the disc and the runout R is processed by the pre-amplifier 22 to generate a tracking error TE. The tracking error TE is transmitted to the compensator 23, e.g. a digital signal processor (DSP), to be processed into a tracking output signal TRO, which is next delivered into two separate paths for further processing. In a normal operation procedure, the pre-amplifier 22, compensator 23, power amplifier 24 and the optical pickup head 25 form a close loop, so that the TRO signal will sequentially pass through the power amplifier 24 and optical pickup head 25 to derive the position P of the optical pickup head. The error signal e between runout R and the position P is then fed back to the pre-amplifier 22. The optical pickup head 25 may read data from the optical disc 1 or record data onto the surface of the optical disc 1 in the normal operation procedure. On the other hand, the pre-amplifier 22, compensator 23, band-pass filter 26 and the maximum detector 27 form another close loop in a calibration procedure. The TRO signal will thus pass through a series-connected band-pass filter 26 and maximum detector 27 to derive the maximum of the TRO signal ("$TRO_{MAX}$" as for short hereinafter) before feeding back into the compensator 23. Please note that the path established by series-connected band-pass filter 26 and maximum detector 27 is enabled for calibration purpose when the optical disk drive is turned on, while this path is disabled under the normal operation procedure since the calibration factor K (relative deductive steps are described later) has been derived and stored in the compensator 23 for the use of the optical disk drive already.

More detailed descriptions regarding the calibration procedure are given as follows firstly. As mentioned in the background, the variations of the power amplifier gain and the optical pickup head sensitivity are not taken into account in the conventional approach. The preferred embodiment introduces a calibration factor K associated with element parameters into the compensator 23 in advance so as to make the tracking output signal TRO independent from the above gain and sensitivity variations, thereby improving the tracking efficiency. In other words, the position P of the optical pickup head 25, which incorporates therein the calibration factor K, is expressed by:

$$P = TRO \times K \times C \times D \quad \text{(eq. 1)}$$

where

C is the actual gain of the power amplifier 24 in operation, and

D is the actual sensitivity of the optical pickup head 25 in operation.

When the optical pickup head 25 is in a status of focus-on but not track-on, the calibration procedure starts and sets the calibration factor K to be 1 (one) at first. Therefore, the product of C and D in (eq. 1) can be shown as:

$$C \times D = \frac{P}{TRO} \quad \text{(eq. 2)}$$

On the other hand, the position P of the optical pickup head 25 can be indicated by the following formula based on the well-known control theory:

$$P = R \times \frac{H}{(1 + H)} \quad \text{(eq. 3)}$$

and $$H = A \times B \times C \times D \quad \text{(eq. 4)}$$

where

A is the actual gain of the preamplifier 22 in operation,

B is the actual gain of the compensator 23 in operation,

C is the gain of the power amplifier 24 in operation,

D is the sensitivity of the optical pickup head 25 in operation, and

R is the runout indicating eccentricity of the optical pickup head 21.

since the calculated H ranges from 50 to 1000, therefore $$P \approx R \quad \text{(eq. 5)}$$

and the product of C and D in (eq. 2) will be:

$$C \times D \approx \frac{R}{TRO} \quad \text{(eq. 6)}$$

Since the tracking output signal TRO and also the runout R are both sinusoids, and their maxima will be obtained substantially simultaneously (relative phase delays between these two signals are ignored in the preferred embodiment), maximum of C×D can be derived by using the equation defined below:

$$C \times D = \frac{P_{MAX}}{TRO_{MAX}} \approx \frac{R_{MAX}}{TRO_{MAX}} \quad \text{(eq. 7)}$$

where $R_{MAX}$ is the maximum runout, and $TRO_{MAX}$ is the maximum of the tracking output signal TRO.

Therefore, the product C×D can be easily calculated by using $TRO_{MAX}$ and $R_{MAX}$ according to (eq. 7) after TRO signal passes through the band-pass filter 26 and the maximum detector 27. In the embodiment, the band-pass filter 26 is provided downstream of the compensator 23 to generate a $TRO_{BPF}$ signal for the purpose of filtering out noise from the tracking output signal TRO. A maximum detector 27, such as a peak hold circuit, is then employed to catch a peak value $TRO_{MAX}$ from the $TRO_{BPF}$ signal. The obtained $TRO_{MAX}$ signal is next fed back to the compensator 23 for calculating the product C×D, which is then stored in the compensator 23 temporarily. Please note that the gain of the power amplifier 24 and the sensitivity of the optical pickup head 25 have nominal values that can be accessed from specifications made by manufacturers or by using the values obtained from detecting candidate drives practically. Moreover, the $TRO_{MAX}$ can be an average of several peak hold values from the filtered TRO signal. Any person having ordinary skills in the art may obtain these parameters as requirements or applications, but any similar modification or rearrangement within the scope of the preferred embodiment should be included in the appended claims. Therefore, after the optical pickup head is in a status of track-on, the calibration factor K according to the above embodiment of the present invention can be defined by the following formula:

$$K = \frac{C_{NOM} \times D_{NOM}}{C \times D} = \frac{C_{NOM} \times D_{NOM}}{\frac{R_{MAX}}{TRO_{MAX}}}. \quad \text{(eq. 8)}$$

where $C_{NOM}$ is a nominal value regarding a gain of a power amplifier coupled with said pickup head, $D_{NOM}$ is a nominal value regarding a sensitivity of said pickup head, Since the effects that the gain and sensitivity variations affecting the tracking operation time have been accumulated into a constant value (i.e. the collecting factor K), which indicates that the preferred embodiment should upgrade the performance of the optical storage system based on the above compensation mechanism. By introducing a calibration factor K associated with element parameters into the DSP operation of the compensator 23 in advance, the tracking output signal TRO would be independent from the above gain and sensitivity variations, thereby improving the tracking efficiency.

Figure 3:
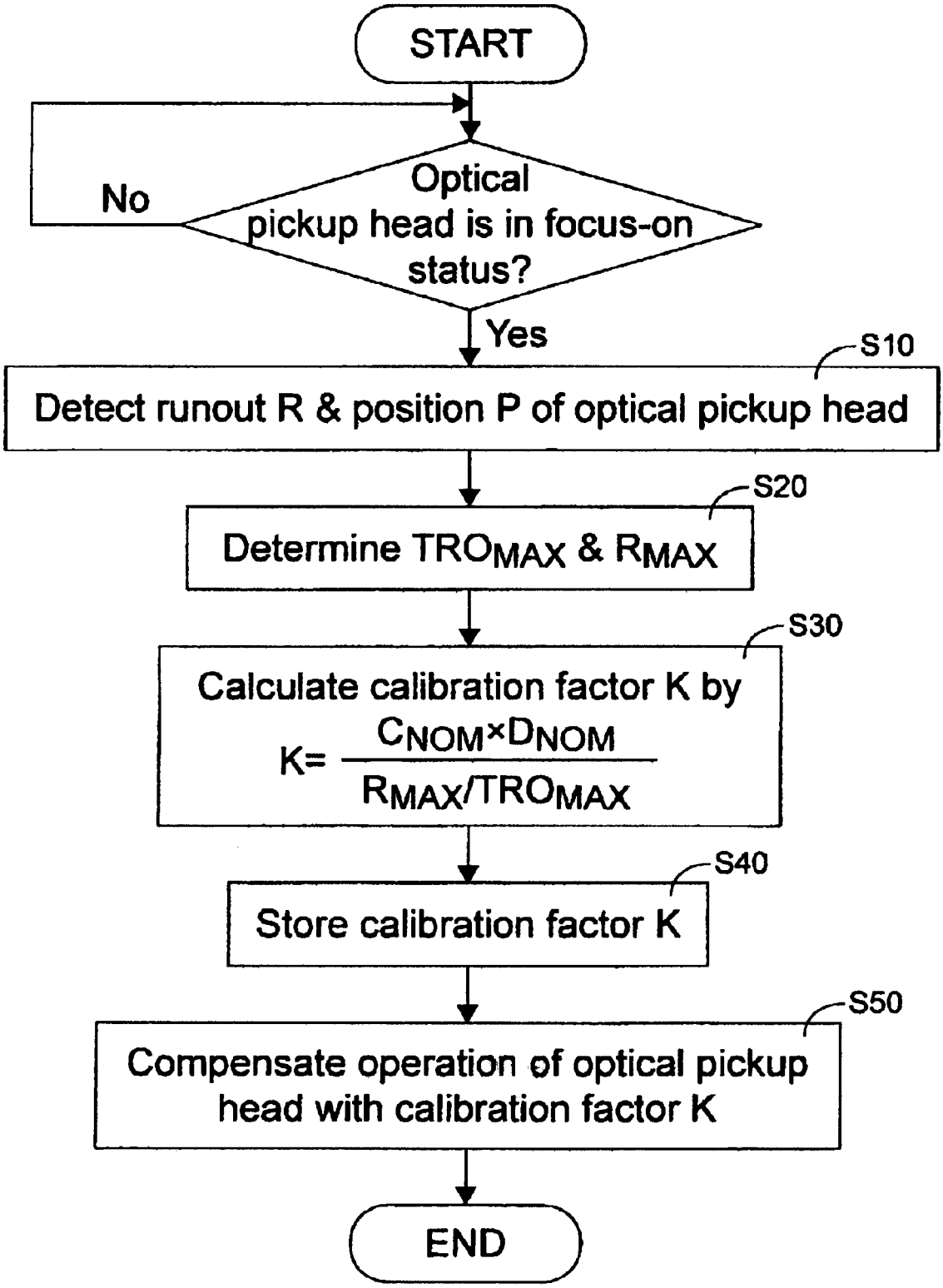
FIG. 3 is a flowchart illustrating a process for controlling a tracking operation of an optical disc drive according to a preferred embodiment of the present invention.

In order to illustrate the process for controlling a tracking operation of an optical disc drive in more details, a flowchart according to a preferred embodiment of the present invention is shown in FIG. 3. In Step S10, a runout R associated with a relative motion between an optical pickup head and a disc, and the position P of the optical pickup head relative to the disc are detected when the optical pickup head is in status of focus-on but not track-on. Then, the maxima of TRO signal and runout R are determined in Step S20 (both defined as $TRO_{MAX}$ and R respectively). Thereafter, a calibration factor K is defined and calculated according to (eq. 8), as shown in Step S30. Please note that $TRO_{MAX}$, $R_{MAX}$, and the nominal values of the power amplifier and the optical pickup head are used to calculate the calibration factor K. This calibration factor K is then stored in the compensator 23 in Step S40 for compensating the variations of the power amplifier gain and the sensitivity of the optical pickup head. Finally, the optical disk drive will operate with compensation provided by the calibration factor K whatever data reading or recording operations are performed (Step S50).

Since the element parameters can be previously compensated in accordance with the present invention, the elements parameters would not have to be compensated for each cycle during the tracking operation, and thus the tracking operation time is considerably reduced. Furthermore, the present invention is illustrated by referring to any kind of optical storage system or optical disk drive, such as a compact disk-read only memory (CD-ROM) drive and a digital versatile disk-read only memory (DVD-ROM) drive. Nevertheless, the present invention can be applied to an optical storage system, for example, a compact disk-recordable (CD-R) drive, a compact disk-rewritable (CD-RW) drive, a digital versatile disk-recordable (DVD-R) drive, a digital versatile disk-rewritable (DVD-RW) drive and a digital versatile disk-random access memory (DVD-RAM) drive.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for controlling a tracking operation of an optical storage system, said optical storage system comprising a pickup head for picking up data from a storage medium, said method comprising steps of:

obtaining a maximum of a runout associated with a relative motion between said pickup head and said storage medium;

obtaining a maximum of a tracking output signal associated with a relative motion between said pickup head and said storage medium;

obtaining a value of a calibration factor by using said maximum of said runout, said maximum of said tracking output signal and element parameters associated with said [computer] *optical* storage system; and actuating said pickup head to operate under a compensation provided by said [calibrated] *calibration* factor.

2. The method according to claim 1 wherein said element parameters include a gain of a power amplifier coupled with said pickup head and a sensitivity of said pickup head.

3. The method according to claim 1 wherein said maximum runout and maximum tracking output signal are obtained when said pickup head is in a status of focus-on but not track-on.

4. The method according to claim 1 wherein said calibration factor K is defined by the following formula:

$$K = \frac{C_{NOM} \times D_{NOM}}{C \times D}$$

where $C_{NOM}$ is a nominal value regarding a gain of a power amplifier coupled with said pickup head, $D_{NOM}$ is a nominal value regarding a sensitivity of said pickup head, C is an actual gain of said power amplifier in operation, D is an actual sensitivity of said optical pickup head in operation.

5. The method according to claim 4 wherein $$C \times D \approx \frac{R_{MAX}}{TRO_{MAX}}$$

where $R_{MAX}$ is said maximum runout, and $TRO_{MAX}$ is said maximum of said tracking output signal.

6. The method according to claim 1 wherein said calibration factor is obtained when said pickup head is in a status of track-on.

7. The method according to claim 1 wherein said optical storage system is a compact disk-read only memory (CD-ROM) drive, a digital versatile disk-read only memory (DVD-ROM) drive, a compact disk-recordable (CD-R) drive, a compact disk-rewritable (CD-RW) drive, a digital versatile disk-recordable (DVD-R) drive, a digital versatile disk-rewritable (DVD-RW) drive, or a digital versatile disk-random access memory (DVD-RAM) drive.

8. A method for controlling a tracking operation of an optical storage system, said optical storage system comprising a pickup head for picking up data from a storage medium, said method comprising steps of:

performing a calibration procedure for deriving a calibration factor by using nominal values of element parameters of said optical pickup head when said pickup head is in a status of focus-on but not track-on; and performing a normal operation procedure for actuating said pickup head to record data on an optical disc or to read data from said disc.

9. The method according to claim 8 wherein said element parameters include a gain of a power amplifier coupled with said pickup head and a sensitivity of said pickup head.

10. The method according to claim 8 wherein said calibration procedure comprising steps of:

obtaining a maximum of a runout associated with a relative motion between said pickup head and said storage medium;

obtaining a maximum of a tracking output signal associated with a relative motion between said pickup head and said storage medium; and obtaining a value of a calibration factor by using said maximum of said runout, said maximum of said tracking output signal and element parameters associated with said [computer] *optical* storage system.

11. The method according to claim 8 wherein said calibration factor K is defined by the following formula:

$$K = \frac{C_{NOM} \times D_{NOM}}{C \times D}$$

where $C_{NOM}$ is a nominal value regarding a gain of a power amplifier coupled with said pickup head, $D_{NOM}$ is a nominal value regarding a sensitivity of said pickup head, C is an actual gain of said power amplifier in operation, D is an actual sensitivity of said optical pickup head in operation.

12. The method according to claim 10 wherein $$C \times D \approx \frac{R_{MAX}}{TRO_{MAX}}$$

where $R_{MAX}$ is said maximum runout, and $TRO_{MAX}$ is said maximum of said tracking output signal.

13. The method according to claim 8 wherein said calibration factor is obtained when said pickup head is in a status of track-on.

14. The method according to claim 8 wherein said optical storage system is a compact disk-read only memory (CD-ROM) drive, a digital versatile disk-read only memory (DVD-ROM) drive, a compact disk-recordable (CD-R) drive, a compact disk-rewritable (CD-RW) drive, a digital versatile disk-recordable (DVD-R) drive, a digital versatile disk-rewritable (DVD-RW) drive, or a digital versatile disk-random access memory (DVD-RAM) drive.

15. A compensation device of an optical storage system, comprising:

a tracking error signal generator for generating a tracking error signal in [responsive] *response* to a runout associated with a relative motion between a pickup head of said optical storage system and [said] *a* storage medium;

a tracking output signal generator for generating a tracking error signal in [responsive] *response* to said tracking error signal; and calibration means for deriving a calibration factor in [responsive] *response* to a maximum of said tracking output signal, a maximum runout, and nominal values of element parameters of said optical storage system, wherein said pickup head operates under a compensation provided by said calibration factor.

16. The compensation device according to claim 15 wherein said tracking error signal generator is a pre-amplifier and said tracking output signal generator includes a compensator.

17. The compensation device according to claim 15 wherein said element parameters include:

a gain of a power amplifier that amplifies said tracking output signal for said pickup head; and a nominal sensitivity of said pickup head.

18. The compensation device according to claim 17 wherein said calibration factor K is defined by the following formula:

$$K = \frac{C_{NOM} \times D_{NOM}}{C \times D}$$

where $C_{NOM}$ is said nominal gain of said power amplifier, $D_{NOM}$ is said nominal sensitivity of said pickup head, C is an actual gain of said power amplifier in operation, D is an actual sensitivity of said optical pickup head in operation.

19. The compensation device according to claim 18 wherein $$C \times D \approx \frac{R_{MAX}}{TRO_{MAX}}$$

where $R_{MAX}$ is a maximum runout, and $TRO_{MAX}$ is said maximum of said tracking output signal.

20. The compensation device according to claim 15 wherein said calibration means includes a maximum detector for finding said maximum tracking output signal from said tracking output signal.

21. The compensation device according to claim 15 wherein said maximum of said tracking output signal and said maximum runout are obtained when said pickup head is in a status of focus-on but not track-on and said calibration factor is obtained when said pickup head is in a status of track-on.

22. The compensation device according to claim 15 wherein said optical storage system is a compact disk-read only memory (CD-ROM) drive, a digital versatile disk-read only memory (DVD-ROM) drive, a compact disk-recordable (CD-R) drive, a compact disk-rewritable (CD-RW) drive, a digital versatile disk-recordable (DVD-R) drive, a digital versatile disk-rewritable (DVD-RW) drive, or a digital versatile disk-random access memory (DVD-RAM) drive.

*23. An optical storage tracking apparatus for controlling a tracking operation of an optical storage system, said optical storage system comprising a pickup head for picking up data from an optical storage medium, comprising:*

*means for obtaining a maximum of a runout associated with a relative motion between the pickup head and the storage medium;*

*means for obtaining a maximum of a tracking output signal associated with a relative motion between the pickup head and the storage medium;*

*means for obtaining a value of a calibration factor by using the maximum of the runout, the maximum of the tracking output signal and element parameters associated with the optical storage system; and*

*means for actuating the pickup head to operate under a compensation provided by the calibration factor.*

*24. The apparatus of claim 23 wherein the element parameters include a gain of a power amplifier coupled with the pickup head and a sensitivity of the pickup head.*

*25. The apparatus of claim 23 wherein the maximum runout and maximum tracking output signal are obtained when the pickup head is in a status of focus-on but not track-on.*

*26. The apparatus of claim 23 wherein the calibration factor K is defined by the following formula:*

$$K = \frac{C_{NOM} \times D_{NOM}}{C \times D}$$

*where*

*$C_{NOM}$ is a nominal value regarding a gain of a power amplifier coupled with the pickup head,*

*$D_{NOM}$ is a nominal value regarding a sensitivity of the pickup head,*

*C is an actual gain of the power amplifier in operation,*

*D is an actual sensitivity of the optical pickup head in operation.*

*27. The apparatus of claim 26 wherein*

$$C \times D \approx \frac{R_{MAX}}{TRO_{MAX}}$$

*where*

*$R_{MAX}$ is the maximum runout, and*

*$TRO_{MAX}$ is the maximum of the tracking output signal.*

*28. The apparatus of claim 23 wherein the calibration factor is obtained when the pickup head is in a status of track-on.*

*29. A compensation apparatus of an optical storage system, comprising:*

*a tracking error signal generator that generates a tracking error signal in response to a runout associated with a relative motion between a pickup head of the optical storage system and a storage medium that is accessed by the optical storage system;*

*a tracking output signal generator that generates a tracking error signal in response to the tracking error signal; and*

*a calibration component that derives a calibration factor based on a function of the tracking output signal, a runout, and nominal values of element parameters of the optical storage system, wherein the pickup head operates with an adjustment based on the calibration factor.*

*30. The compensation apparatus of claim 29 wherein the tracking error signal generator is a pre-amplifier and the tracking output signal generator includes a compensator.*

*31. The compensation apparatus of claim 29 wherein the element parameters include: a gain of a power amplifier that amplifies the tracking output signal for the pickup head; and a nominal sensitivity of the pickup head.*

*32. The compensation apparatus of claim 31 wherein the calibration factor K is defined by the following formula:*

$$K = \frac{C_{NOM} \times D_{NOM}}{C \times D}$$

*where*

*$C_{NOM}$ is the nominal gain of the power amplifier,*

*$D_{NOM}$ is the nominal sensitivity of the pickup head,*

*C is an actual gain of the power amplifier in operation,*

*D is an actual sensitivity of the optical pickup head in operation.*

*33. The compensation apparatus of claim 32 wherein the function is*

$$C \times D \approx \frac{R_{MAX}}{TRO_{MAX}}$$

*where*

*$R_{MAX}$ is a maximum runout, and*

*$TRO_{MAX}$ is a maximum of the tracking output signal.*

*34. The compensation apparatus of claim 29 wherein the calibration component includes a maximum detector for finding a maximum tracking output signal from the tracking output signal.*

*35. The compensation apparatus of claim 29 wherein the tracking output signal and the runout are obtained when the pickup head is in a status of focus-on but not track-on and*

*the calibration factor is obtained when the pickup head is in a status of track-on.*

*36. A method for controlling a tracking operation of an optical storage system, the optical storage system comprising a pickup head for picking up data from a storage medium, comprising:*

*deriving a calibration factor by using nominal values of element parameters of the optical pickup head when the pickup head is in a status of focus-on but not track-on; and*

*performing a normal operation procedure for actuating the pickup head to record data on an optical disc or to read data from the disc.*

*37. The method of claim 36 wherein the element parameters include a gain of a power amplifier coupled with the pickup head and a sensitivity of the pickup head.*

*38. The method of claim 36 wherein the deriving includes:*

*obtaining a maximum of a runout associated with a relative motion between the pickup head and the storage medium;*

*obtaining a maximum of a tracking output signal associated with a relative motion between the pickup head and the storage medium; and*

*obtaining a value of a calibration factor by using the maximum of the runout, the maximum of the tracking output signal and element parameters associated with the optical storage system.*

*39. The method of claim 36 wherein the calibration factor K is defined by the following formula:*

$$K = \frac{C_{NOM} \times D_{NOM}}{C \times D}$$

*where*

$C_{NOM}$ *is a nominal value regarding a gain of a power amplifier coupled with the pickup head,*

$D_{NOM}$ *is a nominal value regarding a sensitivity of the pickup head,*

*C is an actual gain of the power amplifier in operation,*

*D is an actual sensitivity of the optical pickup head in operation.*

*40. The method of claim 39 wherein*

$$C \times D \approx \frac{R_{MAX}}{TRO_{MAX}}$$

*where*

$R_{MAX}$ *is the maximum runout, and*

$TRO_{MAX}$ *is the maximum of the tracking output signal.*

*41. The method of claim 36 wherein the calibration factor is obtained when the pickup head is in a status of track-on.*

* * * * *

UNITED STATES PATENT AND TRADEMARK OFFICE

CERTIFICATE OF CORRECTION

PATENT NO. : RE42,235 E
APPLICATION NO. : 11/971763
DATED : March 22, 2011
INVENTOR(S) : Chu It is certified that error appears in the above-identified patent and that said Letters Patent is hereby corrected as shown below:

On the Title page, item (75), under "Inventor", in Column 1, Line 1, delete "Tapei" and insert -- Taipei --.

Signed and Sealed this
Second Day of August, 2011

David J. Kappos

David J. Kappos
*Director of the United States Patent and Trademark Office*